UNITED STATES PATENT OFFICE.

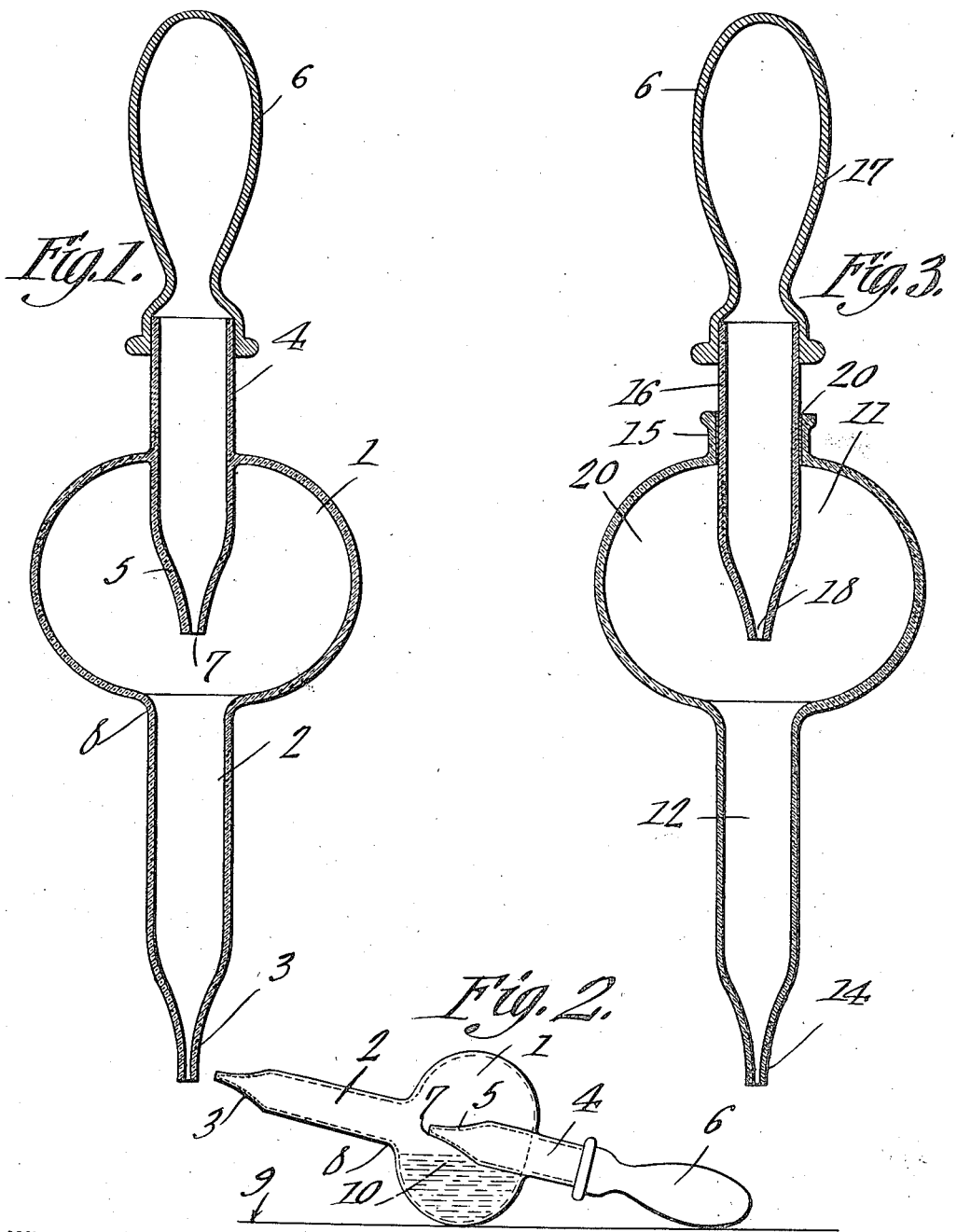

FREDERICK C. LA GRANGE, OF CEDAR RAPIDS, IOWA.

MEDICINE-DROPPER.

1,155,584.  Specification of Letters Patent.  Patented Oct. 5, 1915.

Application filed April 16, 1915. Serial No. 21,865.

*To all whom it may concern:*

Be it known that I, FREDERICK C. LA GRANGE, a citizen of the United States, residing at Cedar Rapids, in the county of Linn and State of Iowa, have invented a new and useful Medicine-Dropper, of which the following is a specification.

The device forming the subject matter of this application is a medicine dropper, and one object of the invention is to provide a device of this type in which medicine or other substance cannot work into the bulb, either when the device stands vertically, or when it is placed upon a support, it being a matter of common knowledge that the bulbs of structures of this sort commonly are manufactured from rubber and that when the medicine or other substance comes into contact with the rubber bulb, it is practically impossible to maintain the bulb in a cleanly, sterile, and sanitary condition.

The invention aims to provide a novel means whereby the charge of liquid may be sucked into the dropper and maintained therein, without coming into contact with the bulb, either when the structure stands vertically or when it is laid on a support.

It is within the province of the disclosure to improve generally and to enhance the utility of device of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawing, Figure 1 shows one form of the invention in longitudinal section; Fig. 2 is a side elevation showing the device of Fig. 1 laid on a support; Fig. 3 is a longitudinal section showing a modified form of the invention.

The device forming the subject matter of this application preferably is made from glass throughout, saving the suction bulb, although some material other than glass may be used if desired.

The device comprises a reservoir 1 which preferably is of globular form and is equipped with an integrally formed discharge tube 2 having a reduced nozzle 3 which may be of any desired shape. Formed integrally with the reservoir 1 is a suction tube 4, one end 5 of which lies within the contour of the reservoir 1 and preferably is reduced or tapered. The tubes 4 and 2 are disposed in coaxial relation and with the outer end of the tube part 4 is assembled a compressible bulb 6 of the usual type.

When the bulb 6 is manipulated, liquid will be drawn into the tube 2 and if a sufficient quantity of liquid thus is sucked in, the liquid will accumulate in the reservoir 1, it being observed that the inner extremity 7 of the tube 4 is spaced from the upper end 8 of the tube 2 by an appreciable distance, so that a considerable quantity of liquid may accumulate in the reservoir 1 without being drawn into the tube 4 by suction. Thus, when the structure stands vertically, the liquid never comes into contact with the bulb 6.

The structure may be placed upon a support 9 as shown in Fig. 2, and since the tube 4 and the bulb 6 are heavier than the tube 2, the latter will be elevated so that its extremity 3 will not come into contact with the support 9, the said extremity of the tube 2 thus being kept clean, sterile and sanitary. Referring to Fig. 2 it will be seen that the liquid which has been sucked into the tube 2 and preferably into the reservoir 1 will, as shown at 10, be maintained in the reservoir 1 without flowing into the tube 4. The extremity 7 of the tube 4 is extended toward the tube 2 to a point beyond the center of the reservoir 1 and therefore, a maximum charge of liquid may be received, as shown at 10, in the reservoir 1, without causing the liquid to overflow into the tube 4 and thus contaminate the bulb 6.

In Fig. 3 of the drawings, the reservoir appears at 11, the discharge tube at 12 and the extremity of the tube 12 at 14. The reservoir 11 may be provided with a neck 15 adapted to receive the suction tube 16, the same carrying a bulb 17 as before. The relations between the inner end 18 of the tube 16, the reservoir 11 and the tube 12 remain unchanged. The tube 16 may be held in the neck 15 by means of cement as indicated at 20. The advantage incident to the use of that form of the invention shown in Fig. 3 resides in the fact that a standard medicine dropper of ordinary form, represented by the parts 16 and 17, may be used in making up the novel structure forming a part of this application. A manufacturer having on hand a supply of standard droppers need not cast away the stock which he has, but may use the same as a part of the invention herein disclosed. Further, since the tube 16 is cemented as shown at 20 into the neck 15, a longitudinal adjustment of the tube 16 with respect to the tube 12 and reservoir 11 is possible.

The device forming the subject matter of this application may not only be used as a syringe, but, as well, may be used as a carrier for transporting corrosive acids and chemicals from one receptacle to another.

Having thus described the invention, what is claimed is:—

1. In a medicine dropper, a suction tube, a discharge tube, and a laterally extended reservoir connected with the tubes, the tubes projecting beyond opposed portions of the reservoir, the inner end of the suction tube lying within the reservoir; and a suction device assembled with the other end of the suction tube.

2. In a medicine dropper, a suction tube, a discharge tube, and a laterally extended reservoir connected with the tubes, the tubes projecting beyond opposed portions of the reservoir, the inner end of the suction tube lying within the reservoir, and being extended toward the discharge tube to a point beyond the center of the reservoir, thereby to retain a maximum charge when the dropper is laid on a support; and a suction device assembled with the outer end of the suction tube.

In testimony that I claim the foregoing as my own, I have hereto affixed my signature in the presence of two witnesses.

FRED. C. LA GRANGE.

Witnesses:
E. A. FORDYCE,
MARIE C. NOVAK.